United States Patent [19]

Nagai et al.

[11] 4,418,367

[45] Nov. 29, 1983

[54] MAGNETIC TAPE SETTING DEVICE FOR USE IN MAGNETIC TAPE RECORDING AND/OR REPRODUCING APPARATUS

[75] Inventors: Kiichirou Nagai; Takashi Okamoto, both of Tokorozawa, Japan

[73] Assignee: Pioneer Electronic Corporation, Tokyo, Japan

[21] Appl. No.: 299,333

[22] Filed: Sep. 4, 1981

[30] Foreign Application Priority Data

Sep. 6, 1980 [JP] Japan .............................. 55-126987[U]

[51] Int. Cl.³ ...................... G11B 15/18; G11B 15/48; G11B 21/08
[52] U.S. Cl. ..................................... 360/75; 360/72.1; 360/74.4; 360/78
[58] Field of Search ....................... 360/75, 72.1, 72.2, 360/74.1, 74.4, 77-78, 13, 73

[56] References Cited

U.S. PATENT DOCUMENTS

| | | | |
|---|---|---|---|
| 3,918,086 | 11/1975 | Blackie et al. | 360/74.4 |
| 4,000,518 | 12/1976 | Stearns | 360/74.4 |
| 4,297,732 | 10/1981 | Freudenschuss | 360/72.1 |
| 4,301,482 | 11/1981 | Trevithick | 360/72.2 |
| 4,342,056 | 7/1982 | Ishii et al. | 360/72.1 |
| 4,363,043 | 12/1982 | Kitamura et al. | 360/72.1 |
| 4,365,278 | 12/1982 | Takizawa et al. | 360/72.1 |
| 4,367,498 | 1/1983 | Kitamura et al. | 360/72.2 |

Primary Examiner—Alfred H. Eddleman
Attorney, Agent, or Firm—Fleit, Jacobson, Cohn & Price

[57] ABSTRACT

A magnetic tape setting device for use in a magnetic tape recording and/or reproducing apparatus having a magnetic head, a head positioning mechanism for positioning the magnetic head to engage with a magnetic tape set in the recording and/or reproducing apparatus, a tape advancing mechanism for advancing the tape, and a controller adapted to control the head positioning mechanism and the tape advancing mechanism for various predetermined mode operations, the magnetic tape setting device being so arranged as to automatically cause, in response to a start command signal, the controller to control the head positioning mechanism and the tape advancing mechanism for firstly CUE mode operation during which the trailing edge of the recorded area of the tape being detected, secondly RVW mode operation after the lapse of a first predetermined period since the detection of the trailing edge of the recorded area, also during the second RVW mode operation the trailing edge of the recorded area of the tape being detected, and thirdly again CUE mode operation which is performed by a second predetermined short period after the detection of the trailing edge of the recorded area of the tape, whereby the magnetic head is automatically positioned at the leading edge of a non-recorded area of the tape i.e. a position suitable for the initiation of recording.

2 Claims, 4 Drawing Figures

MAGNETIC TAPE SETTING DEVICE FOR USE IN MAGNETIC TAPE RECORDING AND/OR REPRODUCING APPARATUS

FIELD OF THE INVENTION

The present invention relates to a magnetic tape recording and/or reproducing apparatus, particularly to a control system thereof.

BACKGROUND OF THE INVENTION

A prior art magnetic tape recording and/or reproducing apparatus requires the manual operations for repeatedly indicating fast forward (FF), play-back (PLAY) and/or rewind (REW) in order to detect the initial extremity or the leading edge of a non-recorded area or zone, in which no information is recorded, of a magnetic tape set in the recording and/or reproducing apparatus.

Repetition of such manual operations is much troublesome and therefore such a magnetic tape recording and/or reproducing apparatus is desirous as to be able to quickly and automatically find out the leading edge of the non-recorded area of the tape in position ready for recording without any manual operations.

SUMMARY OF THE INVENTION

The object of the present invention is to provide a magnetic tape setting device for use in a magnetic tape recording and/or reproducing apparatus, which automatically detects the leading edge of a non-recorded area in a magnetic tape and automatically advances and sets the tape in a position ready for recording, that is, the magnetic head is positioned at the leading edge of the non-recorded region of the tape.

In a magnetic tape recording and/or reproducing apparatus incorporated with the device of the present invention, a magnetic tape is firstly advanced under CUE mode which is fast wind mode operation while the magnetic head still attaches lightly to the advanced magnetic tape. The output level of the magnetic head then lightly engaging the tape is monitored by the device during the first CUE mode operation. When a predetermined period of time has lapsed with the output level of the magnetic head being below a predetermined value in the course of the first CUE mode operation, the winding direction is reversed and the tape is advanced under review (RVW) mode while the magnetic head still attaches to the tape lightly. When the trailing edge of a recorded area of the tape has reached the magnetic head, the tape winding direction is again reversed and the tape is advanced again under CUE mode by a predetermined amount of time. Through such procedures, the magnetic head is positioned at the leading edge of a non-recorded area of the magnetic tape i.e. a position suitable for the initiation of recording operation.

BRIEF DESCRIPTION OF THE DRAWINGS

The invention will now be described by way of example with reference to the accompanying drawings, in which.

DESCRIPTION OF THE PREFERRED EMBODIMENT

Figure 1:
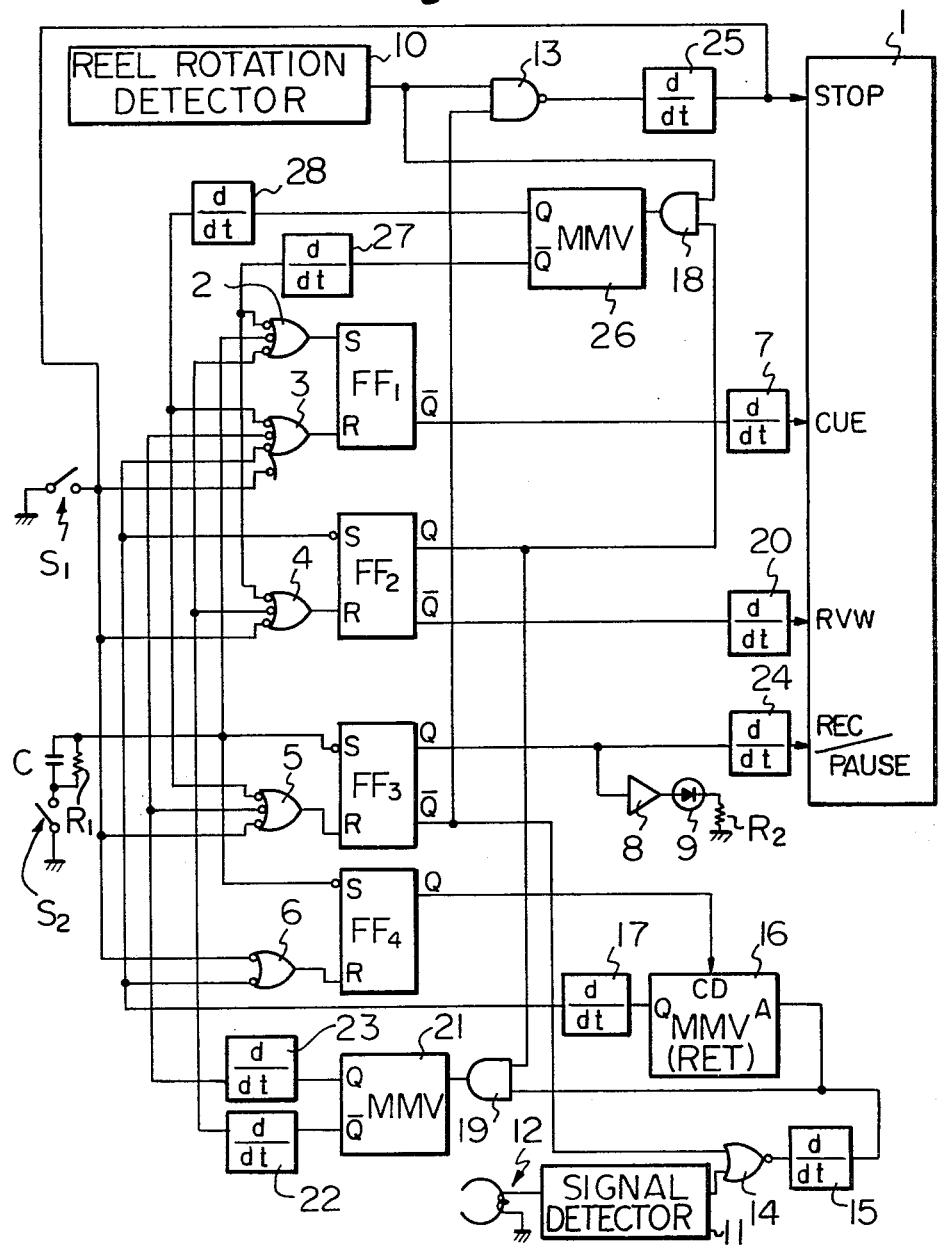
FIG. 1 is a diagram showing a circuit arrangement of an embodiment of the present invention.

Referring now to FIG. 1, there is shown an example of the device according to the present invention. The present device operates to automatically feed operation mode command signals to a mechanism controller 1 of the magnetic tape recording and/or reproducing apparatus (not shown) thereby to automatically position the magnetic head for recording.

In the device of FIG. 1, there is provided a reset switch $S_1$ of non-lock type which, when closed, produces a low level pulse signal. The low level pulse is fed to an input terminal STOP of the controller 1. The controller 1 stops any operation of the tape recording and/or reproducing apparatus in response to the low level pulse fed to the STOP input thereof. The reset switch $S_1$ is connected to one input of each of four NOR gates 3, 4, 5 and 6 as well, whose outputs are respectively connected to reset inputs R of four flip flop circuits FF 1 to FF 4. The flip flops FF1 to FF4 are respectively reset by the low level pulse signal from the reset switch $S_1$ via the NOR gates 3, 4, 5 and 6. A start switch $S_2$ of lock type is provided, which is connected to an end of a parallel circuit constituted by a capacitor C and a resistor $R_1$. The other end of the parallel circuit C, $R_1$ is connected to a set input S of the flip flop FF1 via a NOR gate 2, and further connected directly to set inputs S of the flip flops FF3 and FF4. The capacitor C is charged and a low level pulse is produced by closing the start switch $S_2$ after the closing of the reset switch $S_1$, which low level pulse sets the flip flops FF1, FF3 and FF4.

When set, the $\bar{Q}$ output level of the flip flop FF1 turns from high to low. A differentiating circuit 7 connected to the $\bar{Q}$ output of the flip flop FF1 differentiates the $\bar{Q}$ output and produces a pulse of low level which is fed to the CUE command input of the controller 1. When the flip flop FF3 is set also by the pulse from the start switch $S_2$, the Q output level of FF3 turns from low to high and the $\bar{Q}$ output level turns from high to low. The high level Q output of FF3 is amplified by an amplifier 8 and turns a light-emissive diode 9 on.

A reel rotation detecting circuit 10 is provided, which is arranged to produce a pulse of high level or logic "0" when the tape reels (not shown), on which the magnetic tape is wound, stop. Furthermore, a signal detecting circuit 11 is provided, which is connected to the magnetic head 12 and adapted to produce pulses of high level or logic "0" when a recorded area of the magnetic tape passes by the head 12 and the head produces a signal corresponding to the information recorded in the recorded area.

When the flip flop FF3 is set by the low level pulse from the start switch $S_2$, the $\bar{Q}$ output level of FF3 turns from high to low, as mentioned above. A NAND gate 13 and a NOR gate 14 respectively receive a signal of low level i.e. logic "1" from the $\bar{Q}$ output of the flip flop FF3 after the set of FF3. The output level of the NOR gate 14 turns from low to high, in response to the level change of the $\bar{Q}$ output of FF3. At this moment, a differentiating circuit 15 connected to the NOR gate 14 produces a triggering pulse of high level which is fed to a trigger input terminal A of a monostable multivibrator 16. Triggered by the triggering pulse, the multivibrator 16 turns quasistable state. The multivibrator 16 is arranged to be retriggerable i.e. capable of continuously assuming its quasi-stable state as long as it is triggered before it returns to the stable state. Meanwhile, the Q output level of the flip flop FF4 has become high, whereby the level at the reset input CD of the monostable multivibrator 16 connected to the Q output FF4 is held high.

When the first CUE mode operation is performed under the conditions as stated above and a recorded area of the magnetic tape is passing by the magnetic head 12, the signal detector 11 produces pulses of high level intermittently at a cycle period shorter than the duration of the quasi-stable state of the monostable multivibrator 16, whereby the retriggerable monostable multivibrator 16 is intermittently retriggered so that the Q output level of the multivibrator 16 is continuously held high so long as the magnetic head 12 is facing the recorded area of the magnetic tape. If a leading edge of a non-recorded area of the magnetic tape reaches the magnetic head 12 and then a predetermined amount of time has lapsed with the output level of the head being under a predetermined value in the course of the first CUE mode operation, the signal detector 11 stops producing high level pulses and thus the Q output level of the monostable multivibrator 16 turns from high to low. A differentiating circuit 17 connected to the Q output of the vibrator 16 produces a pulse of low level in response to the change of Q output level of the vibrator 16. The low level pulse from the differentiator 17 is transmitted to the reset inputs R of the flip flops FF1 and FF4 respectively through the NOR gates 3 and 6, and transmitted directly to the set input S of the flip flop FF2 as well, so that the flip flops FF1 and FF4 are reset and the flip flop FF2 is set, respectively. The level at the Q output terminal of the flip flop FF2, which is connected to one input of each of two AND gates 18 and 19, turns from low to high. Contrary to the case of the Q output, the $\bar{Q}$ output level of the flip flop FF2 turns from high to low. A differentiating circuit 20 connected to the $\bar{Q}$ output of the flip flop FF2 produces a triggering pulse of low level in response to the level change at the $\bar{Q}$ output of FF2. The low level triggering pulse is fed to a review mode command input terminal RVW of the controller 1 and whereby the controller 1 switches the operation mode of the magnetic tape recording and/or reproducing apparatus from CUE to RVW. At the same time, by the reset of the flip flop FF4, the level at the reset input terminal CD of the monostable multivibrator vibrator 16 turns low and thus the vibrator 16 is reset.

In the case of a magnetic tape having information recorded therein, the trailing edge of the recorded area of the tape reaches the magnetic head 12 in the course of the RVW mode operation. The signal detector 11 then again produces a high level pulse and whereby the differentiator 15 produces a high level triggering pulse. The triggering pulse triggers via the AND gate 19 a monostable multivibrator 21 whereby the Q output level of which turns from low to high. Meanwhile, on the contrary, the $\bar{Q}$ output level of the monostable multivibrator 21 turns from high to low. A differentiating circuit 22 connected to the $\bar{Q}$ output of the monostable multivibrator 21 then produces a low level triggering pulse which resets the flip flops FF1 and FF2. Thus, the Q output level of the flip flop FF1 turns from high to low, whereby a triggering pulse is again fed from the differentiator 7 to the CUE mode command input of the controller 1 so that the magnetic tape recording and/or reproducing apparatus again initiates to operate under CUE mode. Meanwhile, the monostable multivibrator 21 returns from its quasi-stable state to stable state after the lapse of a predetermined time period and its Q output level turns from high to low. In response to the level change at the Q output of the multivibrator 21, a differentiating circuit 23 connected thereto produces a triggering pulse which resets the flip flops FF1 and FF3. With the flip flop FF3 being reset, the light emissive diode 9 is turned off and a differentiating circuit 24 connected to the Q output of FF3 produces a triggering pulse, which is transmitted to an input terminal REC/PAUSE of the controller 1. In response to the triggering pulse fed to the terminal REC/PAUSE, the controller 1 sets the magnetic tape recording and/or reproducing apparatus ready for recording. The output of the differentiator 24 may be connected to the stop command input STOP of the controller 1. With the flip flop FF3 then assuming its reset state in which the $\bar{Q}$ output level is high, a differentiating circuit 25 connected to the NAND gate 13 feeds a stop command pulse signal to the input STOP of the controller 1 when the reel rotation detector 10 produces a tape end detection pulse signal representative of the stop of the tape reels.

In the case of a magnetic tape having no information recorded therein, the tape reels stop when the tape is rewound up by the RVW mode operation. When the tape reels stop, the reel rotation detector 10 produces a high level triggering pulse, as mentioned above. In response to the triggering pulse, the AND gate 18 in turn produces a high level triggering pulse. A monostable multivibrator 26 connected to the AND gate 18 is triggered by the pulse from the AND gate 18. With the monostable multivibrator 26 then changing its state, the $\bar{Q}$ output level thereof turns from high to low and the Q output level turns from low to high. A differentiating circuit 27 connected to the $\bar{Q}$ output of the monostable multivibrator 26 produces a low level triggering pulse in response to the level change at the $\bar{Q}$ output of the vibrator 26. Flip flop FF1 is set and FF2 is reset, respectively in response to the triggering pulse from the differentiator 27. At this moment, with the $\bar{Q}$ output level of the flip flop FF1 turning from high to low, the differentiator 7 produces a CUE mode command signal which is fed to the input CUE of the controller 1. In response to this CUE mode command signal, the controller 1 switches the operation mode from RVW to CUE. The monostable multivibrator 26 returns to its stable state and its Q output turns from high to low, after the lapse of a predetermined time period since the instant of triggering. A differentiating circuit 28 connected to the Q output of the monostable multivibrator 26 produces a triggering pulse in response to the level change at the Q output of the vibrator 26. The flip flops FF1 and FF3 are respectively reset by the triggering pulse from the differentiator 28 through the NOR gates 3 and 5, respectively. At this instant, with the Q output of the flip flop FF3 turning from high to low, the differentiator 24 connected thereto produces a triggering pulse which is fed to the input REC/PAUSE of the controller 1. In response to the pulse fed to the input REC/PAUSE, the controller 1 sets the magnetic tape recording and/or reproducing apparatus ready for recording.

Figure 2A:
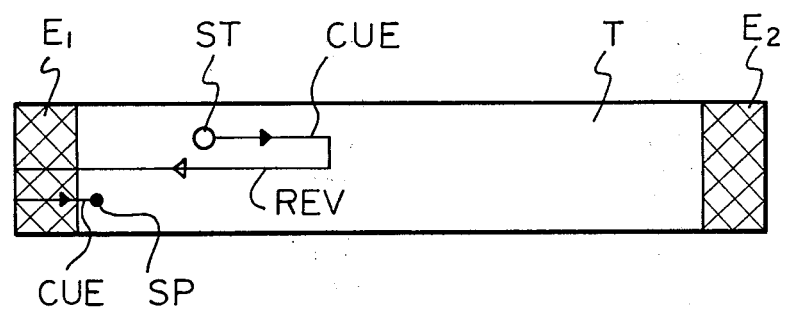
FIG. 2a is a plan view of a magnetic tape having no information recorded thereon, in which the relative position and movement of the magnetic head to the tape is schematically shown by a folded line.
Figure 2B:
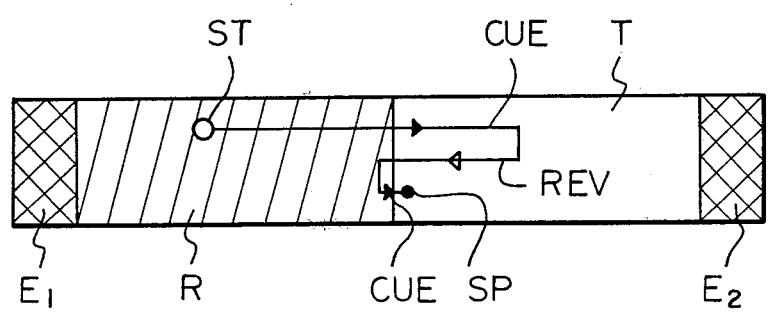
FIG. 2b is a plan view of a magnetic tape having information recorded on an area thereof, in which the relative position and movement of the magnetic head is shown similarly to FIG. 2a, the recorded area of the tape being shown with parallel oblique lines.

In FIGS. 2a and 2b, there are illustrated relative positions and movements of magnetic heads to magnetic tapes in the magnetic tape recording and/or reproducing apparatus operating under the control of the device as shown in FIG. 1.

In the case of FIG. 2a in which the tape T has no information recorded therein, the magnetic head initially located at the position ST is shifted firstly by the CUE mode operation of the recording and/or reproducing apparatus by a predetermined amount of time toward the trailing edge $E_2$ of the tape. The head is succeedingly shifted in the reversed direction by the RVW or review mode operation to reach the leading edge $E_1$ of the tape. The magnetic head is again shifted toward the tape trailing edge $E_2$ by the CUE mode operation by a certain small amount of time to arrive and rest at a position SP suitable for the initiation of recording.

In the case of FIG. 2b, the magnetic tape T has information recorded in an area R thereof. In this case, the magnetic head initially located at the position ST in the recorded region R is shifted firstly by CUE mode operation and secondly by RVW mode operation to return to the trailing edge of the recorded area R and thirdly again by CUE mode operation. The third CUE mode operation is performed by a predetermined small amount of time so that the magnetic head reaches and rests at a position SP in a forward region of the non-recorded area of the tape T i.e. a position suitable for recording.

Figure 3:
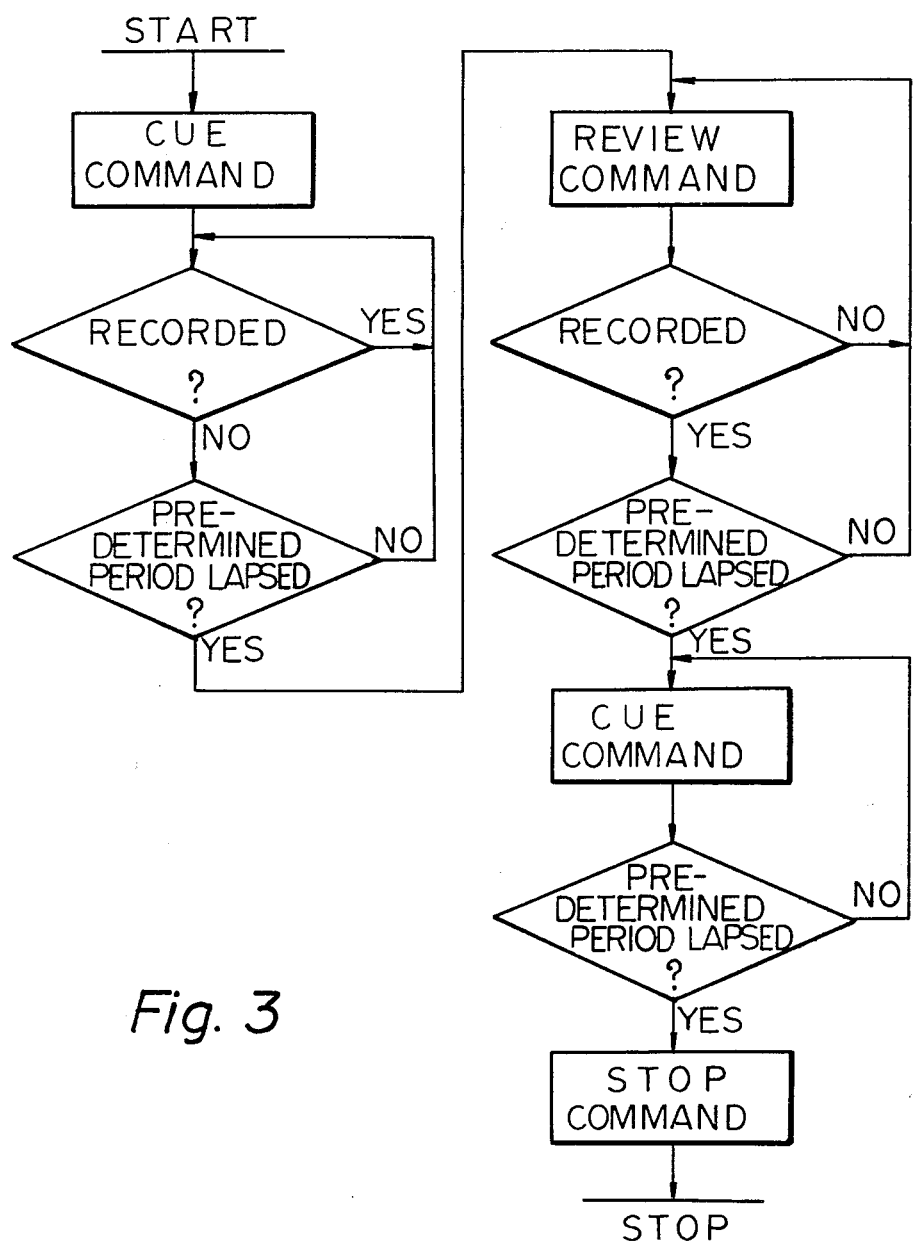
FIG. 3 is a flowchart of the procedures performed by the device shown in FIG. 1.

In FIG. 3, there is shown a flowchart of the procedures performed by the tape setting device of the present invention. A device capable of performing such procedures in accordance with the flowchart shown in FIG. 3 may not be limited to the circuit arrangement as shown in FIG. 1. For example, such a device may be constructed with the use of a so-called microcomputer of microprocessor.

As will be understood from the above description, in accordance with the present invention, it is possible to quickly detect the leading edge of non-recorded area of the magnetic tape thereby to automatically place the tape in position ready for recording. Therefore, in accordance with the present invention, troublesome manual operations for setting the tape for recroding can be dispensed with.

It should further be understood that the device of the present invention can be used in a magnetic tape recording and/or reproducing apparatus provided with two individual magnetic heads one of which is adapted for recording and the other only for reproducing. The device as shown in FIG. 1 of the present invention can be incorporated into such a magnetic tape recording and/or reproducing apparatus by suitably defining the time period of the first CUE mode, the succeeding RVW mode and the last CUE mode operations without changing the circuit arrangement thereof.

What is claimed is:

1. A tape deck controller for controlling a magnetic tape apparatus to perform one of several operational modes including a CUE mode and an RVW mode in response to respective CUE and RVW commands, said magnetic tape apparatus including a magnetic head for detecting recorded signals on a magnetic tape, said CUE operational mode being a fast winding operation during which said head is engaged with said tape and said RVW operational mode being a winding operation in a direction opposite of said fast winding operation during which said magnetic head engages said tape, said controller including a pulse generator for producing a pulse signal when said magnetic head detects a recorded signal on said magnetic tape, a retriggerable timer unit for producing a first trigger signal upon the lapse of a first predetermined time period after disapparance of said pulse signal, a trigger unit for producing a second trigger signal in response to reoccurrence of said pulse signal during the RVW operational mode, a tape set completion signal generator for producing a tape set completion signal when triggered and a tape end detector for producing a tape end signal when the winding of said magnetic tape stops, said controller including:

a first R-S flip-flop circuit having a Q and $\overline{Q}$ output and being responsive to take a RESET state in response to said first trigger signal;

a first differentiator connected to the $\overline{Q}$ output of said first R-S flip-flop circuit for producing said CUE command upon change of state thereof from RESET to a SET state;

a second R-S flip-flop circuit adapted to take a SET state in response to said first trigger signal;

a second differentiator connected to the $\overline{Q}$ terminal of said second R-S flip-flop circuit for producing said RVW command upon change of state thereof from a RESET to said SET state;

start means for causing said first R-S flip-flop circuit to take the SET state when actuated;

a first timer unit for causing said first and second R-S flip-flop circuits to take respectively the SET state and the RESET state upon appearance of said second trigger signal, for causing said first R-S flip-flop circuit to take the RESET state, and for triggering said tape set completion signal generator upon the lapse of a third predetermined time period after the appearance of said second trigger signal; and a second timer unit for causing said first and second R-S flip-flop circuit to take respectively the SET and RESET states upon appearance of said tape end signal when the second R-S flip-flop circuit takes the SET state, for causing said first R-S flip-flop circuit to take the RESET state, and for triggering said tape set completion signal generator upon the lapse of a fourth predetermined time period after the appearance of said tape end signal.

2. A tape deck controller according to claim 1 in which said second timer unit includes gate means (18) for passing therethrough said tape end signal only when a logic signal appears on the Q terminal of said second R-S flip-flop circuit, a monostable multivibrator for taking a quasi-stable state during said fourth predetermined time period, a third differentiator for supplying a first trigger pulse to the SET terminal of said first R-S flip-flop circuit and to the RESET terminal of said second R-S flip-flop circuit at the leading point of the quasi-stable state, and a fourth differentiator for supplying second trigger pulse to the RESET terminal of said first R-S flip-flop circuit and to said tape set completion signal generator.

* * * * *